(12) United States Patent
Do

(10) Patent No.: US 7,917,142 B2
(45) Date of Patent: Mar. 29, 2011

(54) COMPREHENSIVE REGISTRATION METHOD FOR WIRELESS COMMUNICATION SYSTEM

(75) Inventor: Mi-Sun Do, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 615 days.

(21) Appl. No.: 11/713,795

(22) Filed: Mar. 5, 2007

(65) Prior Publication Data

US 2007/0213053 A1  Sep. 13, 2007

(30) Foreign Application Priority Data

Mar. 3, 2006 (KR) .................. 10-2006-0020488
Aug. 29, 2006 (KR) .................. 10-2006-0082155

(51) Int. Cl.
*H04W 4/00* (2009.01)
(52) U.S. Cl. .................. 455/435.1; 455/422.1
(58) Field of Classification Search ......... 455/436–444, 455/411, 433, 435.1, 435.2, 410, 422.1, 315, 455/331; 370/315, 331
See application file for complete search history.

(56) References Cited

U.S. PATENT DOCUMENTS

| | | | | |
|---|---|---|---|---|
| 6,178,171 B1 * | 1/2001 | Alexander et al. | ....... | 370/395.54 |
| 6,944,766 B2 * | 9/2005 | Hamada | ........ | 713/182 |
| 7,106,861 B1 * | 9/2006 | Nishimura et al. | ....... | 380/200 |
| 7,231,521 B2 * | 6/2007 | Buddhikot et al. | ....... | 713/171 |
| 7,630,340 B2 * | 12/2009 | Jung et al. | ........ | 370/331 |
| 2003/0076814 A1 * | 4/2003 | Gurivireddy et al. | ....... | 370/352 |
| 2004/0019539 A1 * | 1/2004 | Raman et al. | ........ | 705/29 |
| 2004/0028055 A1 * | 2/2004 | Madour et al. | ....... | 370/395.21 |
| 2004/0193712 A1 * | 9/2004 | Benenati et al. | ....... | 709/225 |
| 2005/0135622 A1 * | 6/2005 | Fors et al. | ........ | 380/268 |
| 2005/0238171 A1 * | 10/2005 | Chen et al. | ........ | 380/270 |
| 2005/0282546 A1 * | 12/2005 | Chang et al. | ........ | 455/436 |
| 2005/0286471 A1 * | 12/2005 | Yang et al. | ........ | 370/331 |
| 2007/0179904 A1 * | 8/2007 | Hofstee et al. | ........ | 705/67 |
| 2007/0226775 A1 * | 9/2007 | Andreasen et al. | ....... | 726/1 |

OTHER PUBLICATIONS

IETF Request for Comments 3220 by Perkins, Nokia Research Center, Jan. 2002.*

* cited by examiner

*Primary Examiner* — Kent Chang
*Assistant Examiner* — Ronald Eisner
(74) *Attorney, Agent, or Firm* — NSIP Law

(57) ABSTRACT

In a wireless communication system including an access terminal operating based on a hierarchical protocol stack requiring registration for each of individual layers and/or services, a base station providing a wireless access service to the access terminal, and network elements required for performing the registration for each of individual layers and/or services with respect to the access terminal, a comprehensive registration method is provided where the access terminal transmitting to the base station or requesting from the network parameters required for the access terminal to register in at least one layer and service, and the a base station transmits to the corresponding network elements parameters required for the access terminal to register in the at least one layer and/or service and receiving the parameters from the network elements. The access terminal is registered in the at least one layer and/or service depending on the collected parameters. Redundant procedures in the registration of individual layers and/or services are reduced by considering characteristics of the respective layers and/or services, thereby enabling seamless handover as well as fast service.

42 Claims, 6 Drawing Sheets

| MAC | CONNECTION ID | LIFETIME |
|---|---|---|
|  |  |  |

FIG.2A

| HOA | CoA | LIFETIME |
|---|---|---|
|  |  |  |

FIG.2B

| USER URI | CURRENT URI | LIFETIME |
|---|---|---|
|  |  |  |

FIG.2C

COMPREHENSIVE REGISTRATION METHOD FOR WIRELESS COMMUNICATION SYSTEM

CROSS-REFERENCE TO RELATED PATENT APPLICATION

This application claims the benefit under 35 U.S.C. §119(a) of a Korean Patent Application No. 2006-20488 filed on Mar. 3, 2006 in the Korean Intellectual Property Office and Korean Patent Application Serial No. 2006-82155 filed on Aug. 29, 2006 in the Korean Intellectual Property Office, the entire disclosure of both applications is hereby incorporated by reference.

BACKGROUND OF THE INVENTION

1. Field of the Invention

The present invention relates to a method for wireless communication system. More particularly, the present invention relates to a method for comprehensive registration that simplifies registration procedures for individual layers and/or services in an All-IP based wireless communication network.

2. Description of the Related Art

With the development of the Internet and mobile communication technologies, the quantity of wireless data traffic has recently surpassed voice traffic, so much so that the core of information communication is shifting from voice services to packet services. Also, international standardization organizations, focusing on a third generation partnership project (3GPP) and a 3GPP2, have introduced All-IP network concepts and are standardizing the All-IP networks. Essentially, the All-IP network is a next-generation mobile communication network providing real-time and/or non-real-time multimedia services, including voice, image and data, based on an Internet protocol (IP). An All-IP network enables seamless IP-based services irrespective of wireless access methods, real-time and non-real-time multimedia services for voice, images and data, to be provided simultaneously and efficiently sending information by utilizing packet technologies. An All-IP network integrates all services into an IP-based transfer network, thereby providing communication network carriers with an opportunity to economically and efficiently establish a communication network.

However, since a cellular mobile network and an IP network each have their own independent registration procedures for individual layers and/or services, a method for registration suitable for the All-IP network is required as mobile networks evolve into All-IP networks. Traditionally, conventional wireless access networks may require a registration procedure when a wireless link access is established and a Mobile IP (MIP) may require a registration procedure to support macro mobility. Additionally, third generation (3G) networks basically support registration of a session initiation protocol (SIP) to effectuate a session control.

It is expected that a next-generation All IP mobile network will basically provide not only registration for wireless link access but also the MIP and SIP services. If the current registration procedure for each of individual layers and/or services is implemented whenever it is needed in the All-IP network, process latency will unavoidably occur due to redundancy in each layer and/or service and the procedural complexity.

Accordingly, there is a need for a comprehensive registration method that simplifies registration procedures for individual layers and/or services in an All-IP based wireless communication network, which can avoid redundancy in each layer and/or service and the procedural complexity.

SUMMARY OF THE INVENTION

Exemplary embodiments of the present invention address at least the above problems and/or disadvantages and provide at least the advantages described below. Accordingly, an aspect of exemplary embodiments of the present invention is to provide a comprehensive registration method capable of providing seamless handover as well as fast services and reducing overhead on a wireless link by reducing redundant procedures in the registration for each of individual layers and/or services.

Another aspect of exemplary embodiments of the present invention is to provide a method for comprehensive registration in which an access terminal (AT) sends and collects in advance, information required for registration of an upper layer and/or service in an L2 registration procedure for wireless link access, thereby minimizing registration time.

Another aspect of exemplary embodiments of the present invention is to provide a comprehensive registration method in which an L2 registration procedure and information items required for registration of multiple layers are collected and stored as a mobility context table in a wireless access system, such as a base station (BS) and when a handover is detected, information items required for each layer are combined and transmitted, and thus fast registration and handover can be supported.

Another aspect of exemplary embodiments of the present invention is to provided a comprehensive registration method in a wireless communication system including an access terminal operating based on a hierarchical protocol stack requiring registration for each of individual layers and/or services, a base station providing a wireless access service to the access terminal and network elements required for performing the registration for each individual layer and/or services with respect to the access terminal. The comprehensive registration method comprises the access terminal transmitting to the base station or requesting from the network parameters required for the access terminal to register in at least one layer and service, the base station transmitting to the corresponding network elements parameters required for the access terminal to register in at least one layer and/or service and receiving the parameters from the network elements and by using the collected parameters, registering the access terminal in the at least one layer and/or service.

Another aspect of exemplary embodiments of the present invention is to provide acomprehensive registration method for a base station in a wireless communication system including an access terminal operating based on a hierarchical protocol stack requiring registration for each of individual layers and/or services, the base station providing a wireless access service to the access terminal and network elements required for performing the registration for each of individual layers and/or services with respect to the access terminal. The exemplary comprehensive registration method includes receiving parameters required for the access terminal to register in at least one layer and service and a request for the parameters from the access terminal, transmitting the parameters required for the access terminal to register in at least one layer and/or service to the corresponding network elements and receiving the parameters from the network elements and by using the collected parameters, registering the access terminal in at least one layer and/or service.

Another aspect of exemplary embodiments of the present invention provides a comprehensive registration method for an access terminal in a wireless communication system including the access terminal operating based on a hierarchical protocol stack requiring registration for each of individual layers and/or services, a base station providing a wireless access service to the access terminal and network elements required for performing the registration for each of individual layers and/or services with respect to the access terminal. The comprehensive registration method includes transmitting to the base station or requesting from the network parameters required for the access terminal to register in at least one layer and service and the base station transmitting to the corresponding network elements parameters required for registration in each layer and service, and receiving the parameters from the network elements, and waiting to perform registration of the access terminal in the corresponding layer and service by using the collected parameters.

BRIEF DESCRIPTION OF THE DRAWINGS

The above and other exemplary features and advantages of certain exemplary embodiments of the present invention will become more apparent from the following detailed description of certain exemplary embodiments thereof when taken in conjunction with the accompanying drawings in which:

FIGS. 2A through 2C illustrate binding tables stored in a base station (BS), a home agent (HA) and session initiation protocol (SIP) registers, respectively, according to an exemplary embodiment of the present invention;

Throughout the drawings, like reference numerals will be understood to refer to like elements, features and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Also, descriptions of well-known functions and constructions are omitted for clarity and conciseness.

Figure 1:
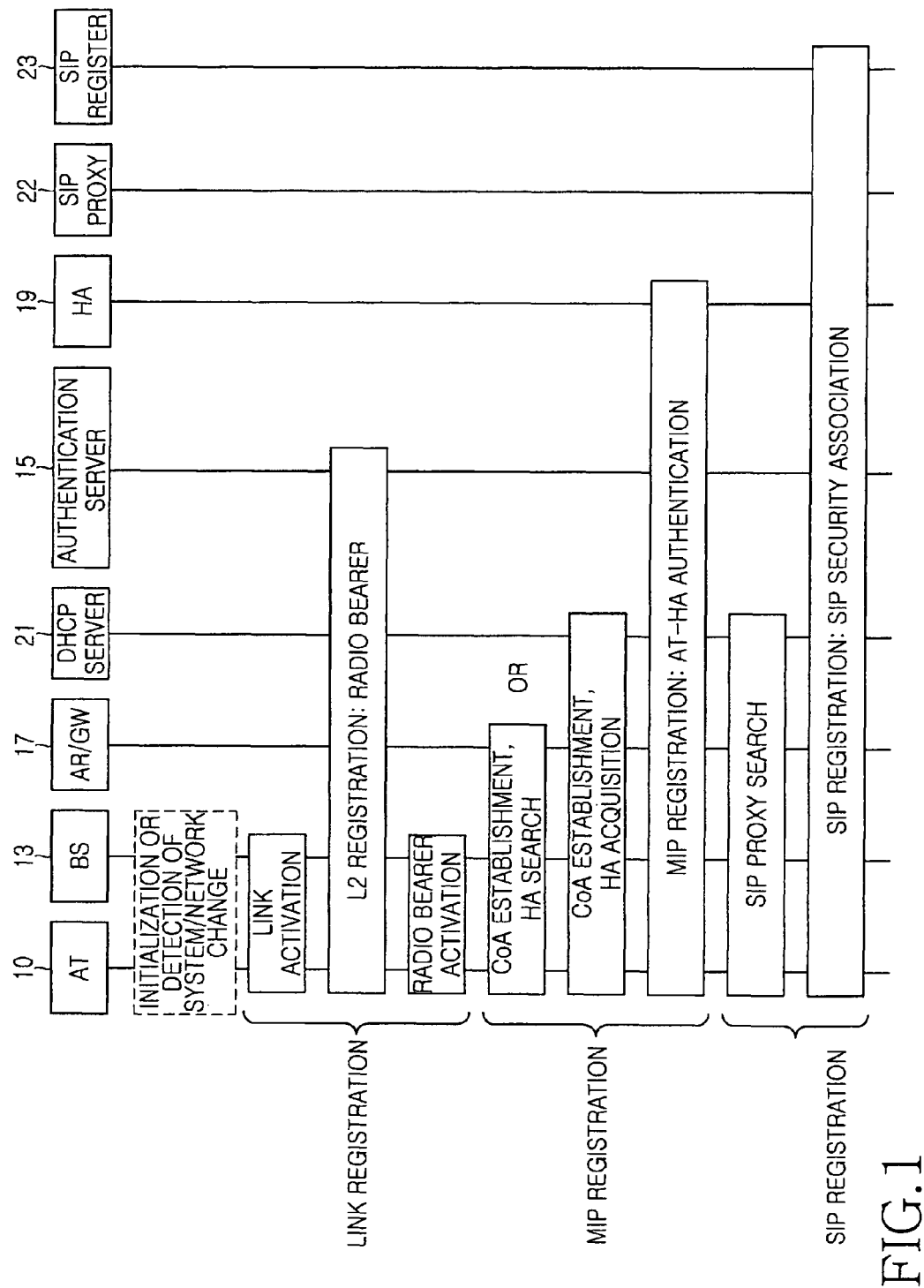
FIG. 1 is a diagram illustrating a comprehensive method registration of an All-IP network with registration procedures according to an exemplary embodiment of the present invention.

FIG. 1 is a diagram illustrating a method for comprehensive registration of an All-IP network with registration procedures according to an exemplary embodiment of the present invention. The registration procedures for individual layers and/or services will be described independently for L2, Mobile IP (MIP), and session initiation protocol (SIP) services, by way of example. For example, when the power is turned on, an access terminal (AT) 10 performs initialization or examines a system and activates a link through a link registration procedure with a base station (BS) 13. In this procedure, the AT 10 performs an authentication procedure with an authentication server 15. When the link registration procedure with the BS 13 is completed, a radio bearer is activated and the BS 13 generates a link ID table. After finishing the link registration procedure, the AT 10 establishes a care-of address (CoA) through communication with an access router (AR) or a gateway (GW) 17 connected to the BS 13, searches for a home agent (HA) 19 or receives an HA address through a dynamic host configuration protocol (DHCP) server 21. When the HA address is acquired, the AT 10 accesses the HA 19 and makes an entry of its CoA in an MIP binding table, thereby completing the MIP registration. In this exemplary procedure, for a secure connection between the AT 10 and the HA 19, the AT 10 performs an authentication procedure with an authentication server 15 as in the link registration procedure.

When the MIP registration is completed, the AT 10 searches for an SIP proxy 22 or acquires the address of the SIP proxy 22 through the DHCP server 21, and makes an entry of the current location of the AT 10 in a binding table in an SIP register 23. In this procedure, for a secure connection between the AT 10 and the proxy 22 and between the proxy 22 and the register 23, the AT 10 and the SIP servers perform authentication procedures with the authentication server 15.

Figure 2A:
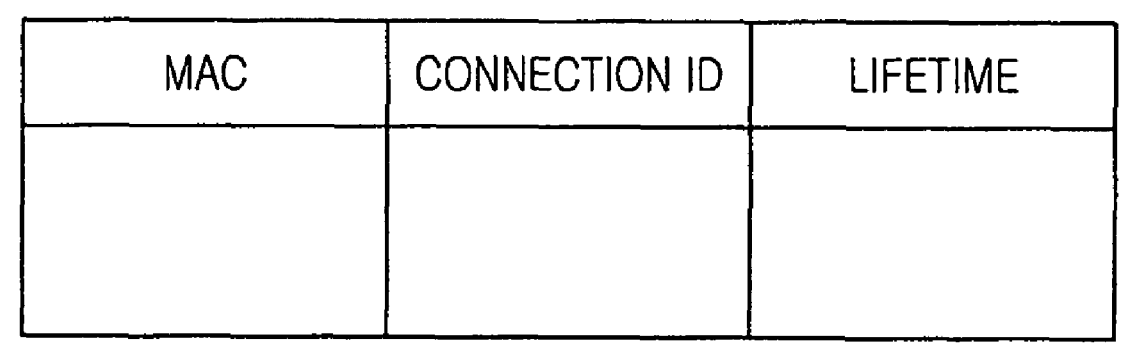
Figure 2B:
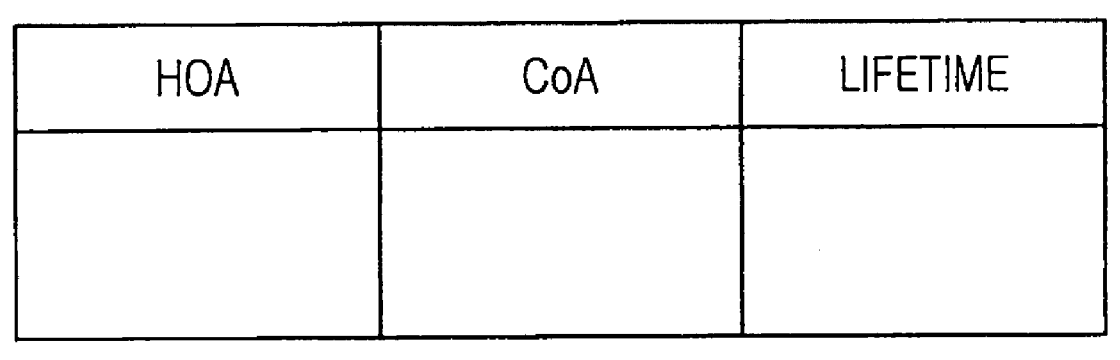
Figure 2C:
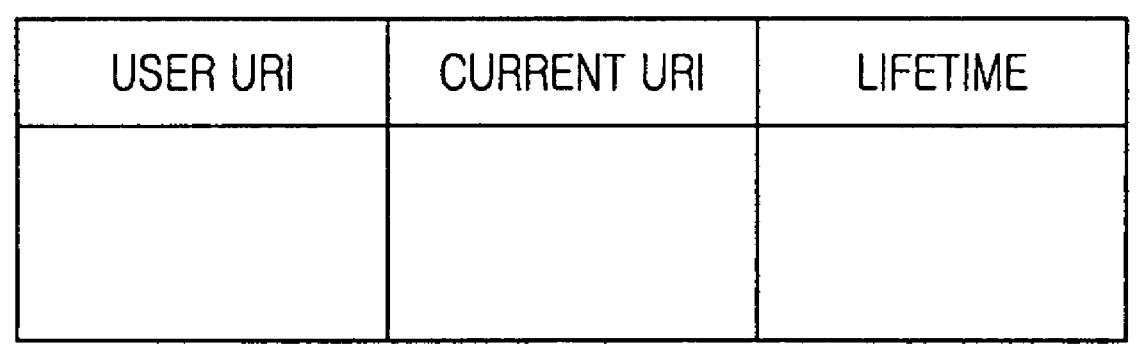

FIGS. 2A through 2C illustrate binding tables stored in a base station BS, an HA, and SIP registers, respectively, according to an exemplary embodiment of the present invention. An L2 binding table illustrated in FIG. 2A includes media access control (MAC) address, connection ID (CID) and lifetime fields of an AT. An IP address binding table illustrated in FIG. 2B includes HoA, CoA and lifetime fields. A SIP address binding table illustrated in FIG. 2C includes user uniform resource identifier (URI), current URI and lifetime fields.

As described above, an AT needs to register in each layer and services and information items required for the AT to register in each layer and services are different from each other.

Figure 3:
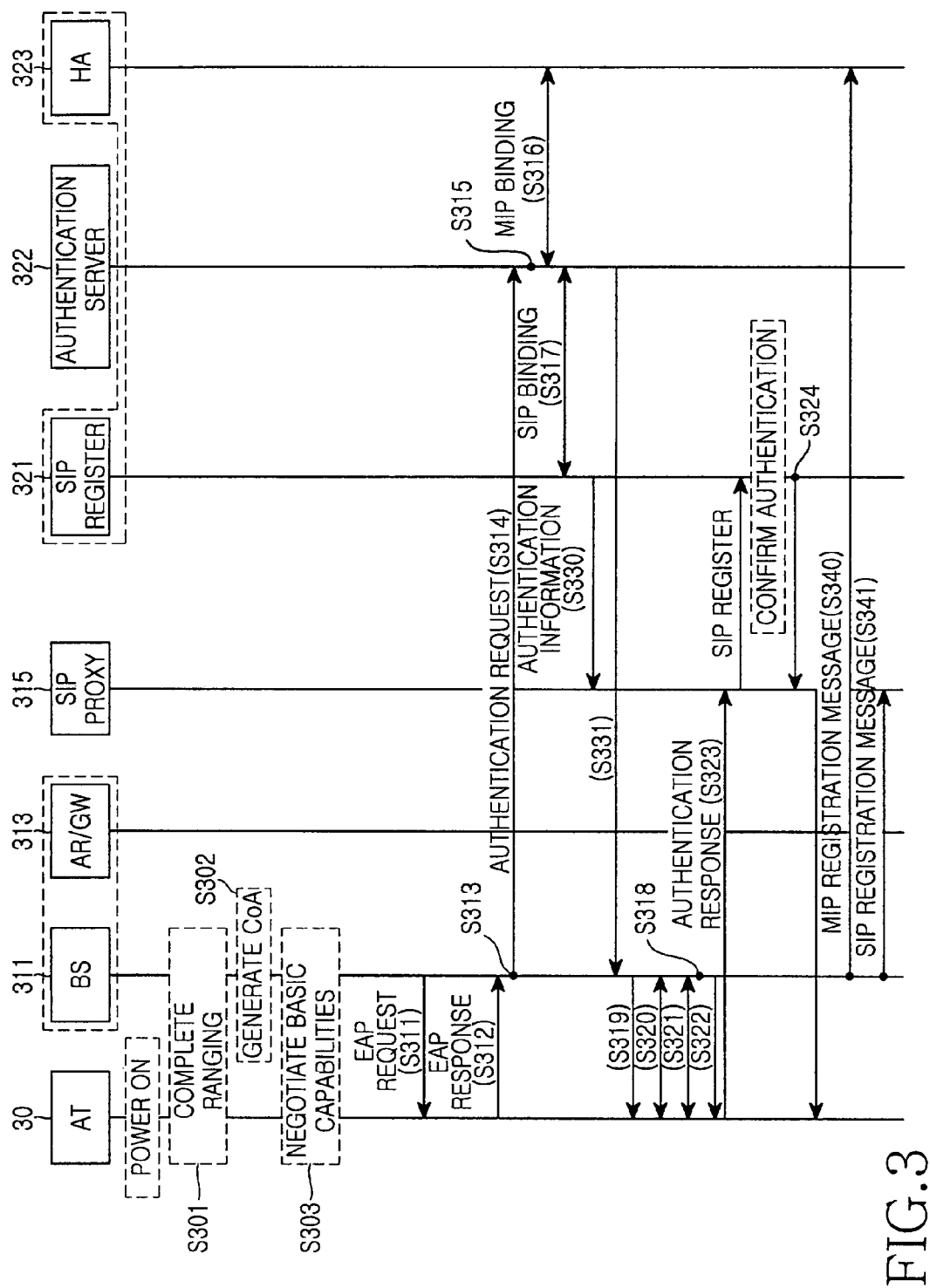
FIG. 3 is a message flowchart illustrating a comprehensive registration method in an All-IP network according to an exemplary embodiment of the present invention.

FIG. 3 is a message flowchart illustrating a comprehensive registration method in an All-IP network according to an exemplary embodiment of the present invention. First, when the power is turned on, an AT 30 performs an initial ranging procedure, S301, and if the initial ranging procedure is successfully completed, an BS 311 generates a CoA unique to the AT 30, S302. In a case where the BS 311 does not support generation of a CoA, S302, the generation of a CoA is performed, S315. If the generation of a CoA is completed, the AT 30 and the BS 311 perform negotiation of basic capabilities at a link layer to determine an L2 key management protocol, an authentication policy, an MAC mode, and so on, S303.

If the L2 key management protocol, the authentication policy, the MAC mode, and so on are thus determined, local challenge information and an EAP request message requesting a user ID are sent to the AT 30 using an extensible authentication protocol (EAP), S311. In response to this, the AT 30 sends an EAP response message including its own user ID, to the BS 311, S312.

After the EAP response message from the AT 30 is received, the BS 311 generates a set of coupled registration parameters for an All-IP mobile network basic service with the user ID and network prefix information, and thus generates an initial registration parameter list and a mobile content table (MCT), S313. The initial registration parameter list includes the user ID, CoA, tempURL and the like. If generation of a CoA, S302, is not supported, the CoA is expressed as null (or the CoA is nullified). The MCT is formed with an initial registration parameter list value at its initial stage.

When the initial registration parameter list and the MCT are generated, the BS 311 generates an authentication request message using the parameters and embedded binding information containing binding update (BU) and a SIP register, and sends the message to an authentication server 322; S314. The authentication request message may include user ID information, binding information, a proxy address, and an upper layer registration server address. In a case where the proxy address and the upper layer registration server address are not known, the authentication request message may also include requests for these addresses.

When the authentication request message is received, the authentication server 322 generates a session key, and selects an HA 323, and an SIP register 321 as upper layer basic service registration servers, S315. If generation of a CoA, S302, is not supported, the authentication server 322 acquires a CoA and generates a CoA, S315. Then, the authentication server 322 sends a binding message to the HA 323 and the SIP register 321 on behalf of the AT 30, and generates authentication data information, S316 and S317. Based on the SIP binding information and the authentication data information, the SIP register 321 sends authentication information to a SIP proxy 315, S330. Based on the authentication data information and information items collected from the HA 323 and the SIP register 321, the authentication server 322 sends an authentication response message as a response to the authentication request message, to the BS 311, S331. The authentication response message includes binding acknowledge (BA), authentication information, a registration server address, a proxy address, and key information. When the authentication response message is received, the BS 311 copies upper layer registration related information, including an upper layer user ID, upper layer registration server addresses, the proxy server address, and the session key, in the MCT, thereby updating the MCT in step S318.

After updating the MCT, the BS 311 can send an EAP success message to the AT 30, thereby notifying the AT that the subscriber authentication is completed, S319. If the subscriber authentication is completed, the AT 30 and the BS 311 establishes L2 security association on a wireless link, S320, and complete the L2 registration by exchanging messages, step S321. Then, the BS 311 sends an authentication response message to the AT 30, thereby completing the MIP registration, and sending SIP proxy and authentication information, S322. If the MIP registration is completed, the AT 30 sends an SIP registration message to the SIP register 321 through an SIP proxy 313, and thus completes the SIP registration in step S323. Meanwhile, the SIP register 321 receives the SIP registration message from the AT 30, performs authentication, and confirms SIP binding information, S324.

In steps S340 and S341, upper layer and/or service registration messages, (for example an MIP registration message and an SIP registration message), are sent periodically according to a value determined by the BS 311, not by the AT 30. In FIG. 3, the dotted lines are used to indicate functions that may be logically separate from each other but can be integrated and implemented together.

Figure 4:
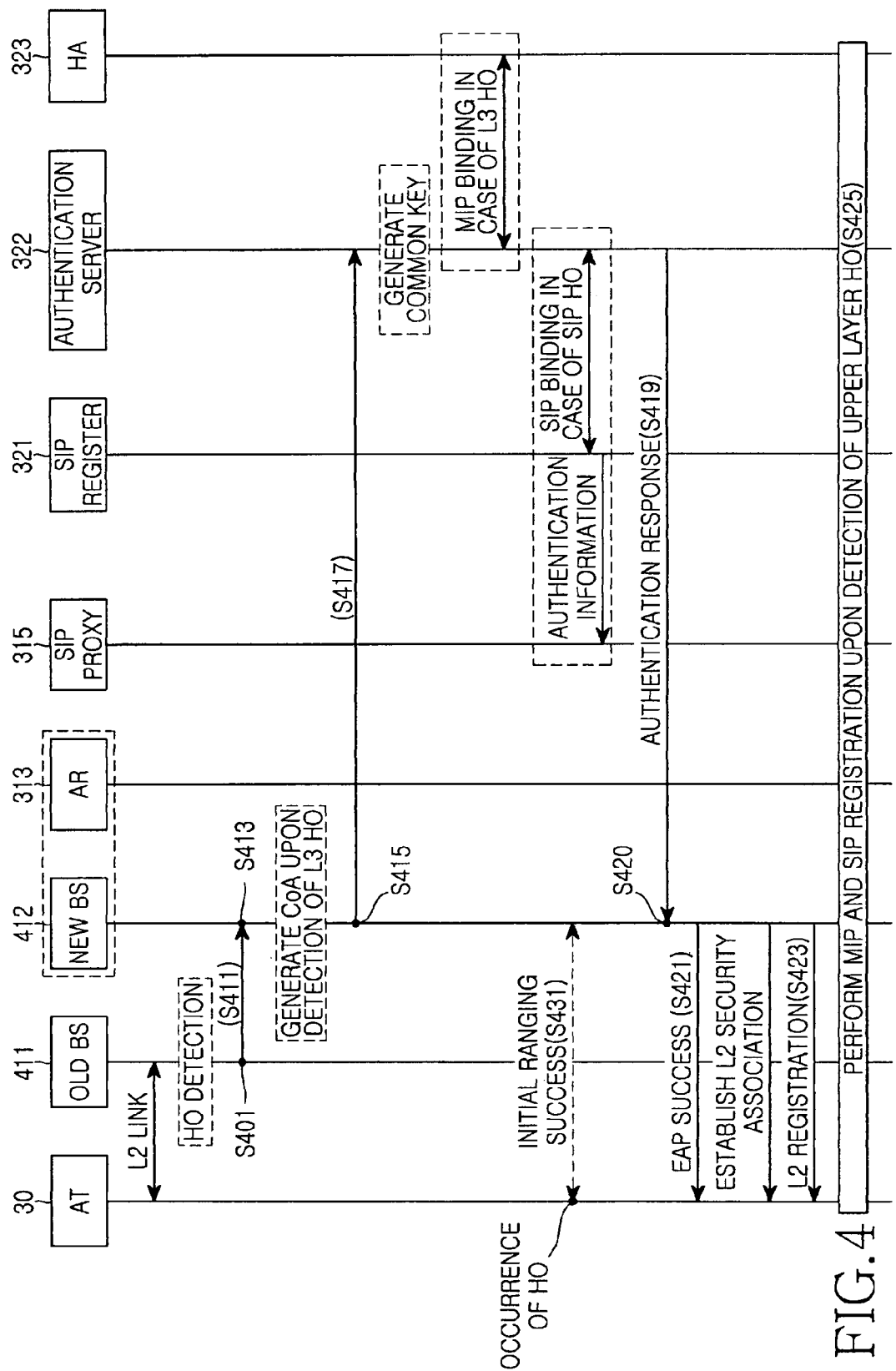
FIG. 4 is a message flowchart illustrating a comprehensive registration method in an All-IP network when a handover is performed according to an exemplary embodiment of the present invention.

FIG. 4 is a message flowchart illustrating a comprehensive registration method in an All-IP network when a handover is performed according to another exemplary embodiment of the present invention. For example, when a handover (HO) is detected, an old BS 411 to which an AT 30 is connected, identifies the range of a coupled registration, by identifying a layer where the HO occurs. Then, the old BS 411 generates a set of parameters to be loaded on a context transmission message from an MCT, S401, and transmits the set to a new BS 412, S411. If the context transmission message is received, the new BS 412 generates a MCT based on the message, and identifies a HO of which layer will occur, S413.

If the layer in which the HO will occur is identified, the new BS 412 generates an authentication request message including coupled registration information before L2 activation, S415. In a case where upper layer registration should be performed, the binding information of the authentication request message includes an embedded BU and SIP register message.

The new BS 412 sends the authentication request message to an authentication server on behalf of the AT 30 before L2 activation, S417. If the authentication request message is received, the authentication server 322 generates a common key, performs a registration procedure with respect to the layer in which the HO will occur, and sends an authentication response message to the new BS 412, S419.

When the authentication response message is received, if initial ranging with the AT 30 is completed, the new BS 412 updates the MCT using information acquired through the authentication response message, S420, and sends an EAP success message to the AT 30, thereby notifying the AT that subscriber authentication is successfully completed, S421.

If the initial ranging, S431, with the AT 30 is not completed, the new BS 412 waits until the initial ranging is successfully completed, and then notifies the AT that subscriber authentication is successfully complete, S421.

If the subscriber authentication is completed, the new BS 412 and the AT 30 perform L2 registration, S423, and if an upper layer HO occurs (MIP or/and SIP HO), MIP registration and SIP registration are performed, S425. This procedure is similar to the exemplary procedure illustrated in FIG. 3.

Though the MIP and SIP registration services are described as basic capabilities provided by the comprehensive registration method according to exemplary embodiments of the present invention, registration for other functionalities or services can also be comprehended in the comprehensive registration method according to exemplary embodiments of the present invention.

According to a comprehensive registration method of the present invention as described in the exemplary embodiments above, redundant procedures in the registration of individual layers and/or services can be reduced by considering characteristics of the respective layers and/or services, thereby enabling seamless handover as well as fast service. Also, overhead on a wireless link can be reduced.

Furthermore, according to a comprehensive registration method of the present invention as described in the exemplary embodiments above, in a L2 registration procedure for establishing a wireless link access, an AT can send and collect in advance information items required for upper layer/service registration, thereby minimizing a registration time.

Additionally, according to a comprehensive registration method of the present invention as described in the exemplary embodiments above, in an L2 registration procedure, information items required to perform registration of multiple layers can be transmitted, collected and stored as an MCT in a wireless access system, such as an AN, and when an HO is detected, information items required for each layer are combined and transmitted and thus fast registration and handover can be supported.

The above-described exemplary embodiments of a comprehensive registration method may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

While the present invention has been shown and described with reference to certain exemplary embodiments as defined by the appended claims and their equivalent. It is to be appreciated that those skilled in the art can change or modify the exemplary embodiments without departing from the scope of the invention.

What is claimed is:

1. A comprehensive registration method in a wireless communication system, the method comprising:
    transmitting to a base station a set of parameters, via an access terminal, for the access terminal to register in a data link layer of the base station;
    transmitting, via the base station, to corresponding network elements, the set of parameters for the access terminal to register in the data link layer;
    receiving, from the network elements to the base station, binding information for the access terminal to use to bind with at least one upper layer, and an authentication key for each of the at least one upper layers; and
    in response to receiving the binding information, registering the access terminal in the data link layer of the base station based on the set of parameters,
    wherein, during the registering, the base station sends the binding information to the access terminal.

2. The method of claim 1, wherein the network elements comprise an authentication server and a proxy or registration server for each layer.

3. The method of claim 1, wherein the network elements comprise a home agent for registration of a mobile internet protocol service.

4. The method of claim 1, wherein the network elements comprise session initiation protocol servers for registration of a session initiation protocol service.

5. The method of claim 1, wherein the set of parameters further comprise an access terminal address, a service registration server address, and a proxy server address.

6. The method of claim 1, further comprising:
    storing, in the base station, information transmitted from the access terminal or collected from the network elements at each layer as a mobile context table; and
    managing the mobile context table.

7. The method of claim 6, further comprising
    performing, via the base station, re-registration in a service server on behalf of the access terminal using the mobile context table.

8. The method of claim 6, wherein the mobile context table comprises at least one of a list of user identifications for respective layers, a list of registration servers for respective services, a list of proxies and a list of security keys.

9. The method of claim 8, wherein the list of user identifications list comprises at least one of a media access control address of a user, a home address for a mobile internet protocol and a user uniform resource identifier for an session initiation protocol.

10. The method of claim 8, wherein the registration server list comprises at least one of a home agent address for a mobile internet protocol, a session initiation protocol proxy and/or register address for a session initiation protocol, and addresses of other application proxies and/or registers.

11. The method of claim 8, wherein the list of security keys comprises at least one of a local key and a session key.

12. The method of claim 1, wherein if a handover is detected, the base station sends the set of parameters received from the access terminal to another base station related to the handover, thereby performing a comprehensive registration.

13. A comprehensive registration method for a base station in a wireless communication system, the method comprising:
    receiving a set of parameters for an access terminal to register in the data link layer of the base station;
    transmitting the set of parameters for the access terminal to register in the data link layer to corresponding network elements;
    receiving, from the network elements, binding information for the access terminal to use to bind with at least one upper layer and an authentication key for each of the at least one upper layers; and
    in response to receiving the binding information, registering the access terminal in the data link layer of the base station based on the set of parameters,
    wherein, during the registering, the base station sends the binding information to the access terminal.

14. The method of claim 13, wherein the network elements comprise an authentication server and a proxy or registration server for each layer.

15. The method of claim 13, wherein the network elements comprise a home agent for registration of a mobile internet protocol service.

16. The method of claim 13, wherein the network elements comprise a session initiation protocol servers for registration of a session initiation protocol service.

17. The method of claim 13, wherein the parameters comprises at least one of an access terminal address, a service registration server address, and a proxy server address.

18. The method of claim 13, further comprising:
    storing information transmitted from the access terminal or collected from the network elements at each layer as a mobile context table; and
    managing the mobile context table.

19. The method of claim 18, further comprising
    performing re-registration in a service server on behalf of the access terminal using the mobile context table.

20. The method of claim 18, wherein the mobile context table comprises at least one of a list of user identifications for respective layers, a list of registration servers for respective services, a list of proxies and a list of security keys.

21. The method of claim 20, wherein the list of user identifications list comprises at least one of a media access control address of a user, a home address for a mobile internet protocol, and a user uniform resource identifier for a session initiation protocol.

22. The method of claim 20, wherein the registration server list comprises at least one of a home agent address for a mobile internet protocol, a session initiation protocol proxy and/or register address for a session initiation protocol, and addresses of other application proxies and/or registers.

23. The method of claim 20, wherein the list of security keys comprises at least one of a local key and a session key.

24. The method of claim 13, wherein if a handover is detected, the base station sends the set of parameters received from the access terminal to another base station related to the handover, thereby performing a comprehensive registration.

25. A comprehensive registration method for an access terminal in a wireless communication system, the comprehensive registration method comprising:
    transmitting to a base station a set of parameters for the access terminal to register in a data link layer of the base station;
    receiving, from the base station, binding information for the access terminal to use to bind with at least one upper layer and an authentication key for each of the at least one upper layers, which are sent from corresponding network elements to the base station; and
    in response to receiving the binding information, registering the access terminal in the data link layer of the base station based on the set of parameters,
    wherein, during the registering, the access terminal receives, from the base station, the binding information for the access terminal to use to bind with the at least one upper layer.

26. The method of claim 25, wherein the network elements comprise an authentication server, and a proxy or registration server for each layer.

27. The method of claim 25, wherein the network elements comprise a home agent for registration of a mobile internet protocol service.

28. The method of claim 25, wherein the network elements comprise a session initiation protocol server for s registration of a session initiation protocol service.

29. The method of claim 25, wherein the parameters comprises at least one of an access terminal address, a service registration server address, and a proxy server address.

30. The method of claim 25, further comprising:
    storing, via the base station, information transmitted from the access terminal or collected from the network elements at each layer as a mobile context table; and
    managing the mobile context table.

31. The method of claim 30, further comprising
    performing, via the base station, re-registration in a service server on behalf of the access terminal using the mobile context table.

32. The method of claim 30, wherein the mobile context table comprises at least one of a list of user identifications for respective layers, a list of registration servers for respective services, a list of proxies and a list of security keys.

33. The method of claim 32, wherein the list of user identifications comprises at least one of a media access control address of a user, a home address for a mobile internet protocol and a user uniform resource identifier for a session initiation protocol.

34. The method of claim 32, wherein the registration server list comprises at least one of a home agent address for a mobile internet protocol, a session initiation protocol proxy and/or register address for a session initiation protocol and addresses of other application proxies and/or registers.

35. The method of claim 32, wherein the list of security keys comprises at least one of a local key and a session key.

36. The method of claim 25, wherein if a handover is detected, the base station sends the set of parameters received from the access terminal to another base station related to the handover, thereby performing a comprehensive registration.

37. A non-transitory computer readable storage medium encoded with instructions which when executed by a computer cause a processor to execute a comprehensive registration method, the executable instructions comprising:
    a first set of instructions for transmitting to a base station a set of parameters for an access terminal to register in a data link layer of the base station;
    a second set of instructions for transmitting, via the base station, to corresponding network elements, the set of parameters for the access terminal to register in the data link layer, and receiving, from the network elements to the base station, binding information for the access terminal to use to bind with at least one upper layer, and an authentication key for each of the at least one upper layers; and
    a third set of instructions for, in response to receiving the binding information, registering the access terminal in the data link layer of the base station based on the set of parameters,
    wherein, during the registering, the base station sends the binding information to the access terminal.

38. A non-transitory computer readable storage medium encoded with instructions which when executed by a computer cause a processor to execute a comprehensive registration method for a base station in a wireless communication system, the executable instructions comprising:
    a first set of instructions for receiving a set of parameters for an access terminal to register in a data link layer of the base station;
    a second set of instructions for transmitting the set of parameters for the access terminal to register in the data link layer to corresponding network elements, and receiving, from the network elements, binding information for the access terminal to use to bind with at least one upper layer and an authentication key for each of the at least one upper layers; and
    a third set of instructions for, in response to receiving he binding information, registering the access terminal in the data link layer based on the set of parameters,
    wherein, during the registering, the base station sends the binding information to the access terminal.

39. A non-transitory computer readable storage medium encoded with instructions executable by an access terminal, the executable instructions comprising:
    a first set of instructions for transmitting to a base station a set of parameters for the access terminal to register in a data link layer of the base station;
    a second set of instructions for receiving, from the base station, binding information for the access terminal to use to bind with at least one upper layer and an authentication key for each of the at least one upper layers, which are sent from corresponding network elements to the base station; and
    a third set of instructions for, in response to receiving the binding information, registering the access terminal in the data link layer of the base station based on the set of parameters,
    wherein, during the registering, the access terminal receives, from the base station, the binding information for the access terminal to use to bind with the at least one upper layer.

40. The method of claim 1, wherein the access terminal operates based on a hierarchical protocol stack requiring registration for each of individual layers, the base station provides a wireless access service to the access terminal, and the network elements are required for performing the registration for each of individual layers with respect to the access terminal.

41. The method of claim 13, wherein the access terminal operates based on a hierarchical protocol stack requiring registration for each of individual layers, the a base station provides a wireless access service to the access terminal, and the network elements are required for performing the registration for each of individual layers with respect to the access terminal.

42. The method of claim 25, wherein the access terminal operates based on a hierarchical protocol stack requiring registration for each of individual layers, the a base station provides a wireless access service to the access terminal, and the network elements are required for performing the registration for each of individual layers with respect to the access terminal.

* * * * *